(12) United States Patent
Kim (10) Patent No.: US 8,094,564 B2
(45) Date of Patent: Jan. 10, 2012

(54) COMMUNICATION SYSTEM, METHOD AND APPARATUS FOR PROVIDING MIRRORING SERVICE IN THE COMMUNICATION SYSTEM

(75) Inventor: Jong-Hwan Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 814 days.

(21) Appl. No.: 11/325,860

(22) Filed: Jan. 5, 2006

(65) Prior Publication Data

US 2006/0171321 A1 Aug. 3, 2006

(30) Foreign Application Priority Data

Jan. 28, 2005 (KR) .................. 10-2005-0008178

(51) Int. Cl.
*H04L 12/28* (2006.01)

(52) U.S. Cl. ........ 370/241; 370/352; 370/389; 370/390; 709/216; 709/219; 709/230

(58) Field of Classification Search .................. 370/390, 370/392, 250, 401, 394, 352; 379/93.17, 379/352; 709/216, 217, 230, 234, 224; 711/114
See application file for complete search history.

(56) References Cited

U.S. PATENT DOCUMENTS

| 6,883,065 | B1 * | 4/2005 | Pittelkow et al. ............. 711/114 |
| 6,925,079 | B2 * | 8/2005 | Matsukawa .................. 370/389 |
| 7,277,424 | B1 * | 10/2007 | Dowling ....................... 370/352 |
| 7,292,573 | B2 * | 11/2007 | LaVigne et al. .............. 370/390 |
| 2002/0029281 | A1 * | 3/2002 | Zeidner et al. ................ 709/230 |
| 2002/0032770 | A1 * | 3/2002 | Fertell et al. ................. 709/224 |
| 2003/0174725 | A1 | 9/2003 | Shankar |
| 2004/0249904 | A1 * | 12/2004 | Moore et al. .................. 709/216 |
| 2005/0076099 | A1 * | 4/2005 | Wang et al. ................... 709/219 |
| 2007/0140448 | A1 * | 6/2007 | Lin et al. ..................... 379/93.17 |

FOREIGN PATENT DOCUMENTS

| EP | 1 376 934 | | 1/2004 |
| WO | WO 01/13235 | * | 2/2001 |
| WO | WO 2004/025884 | | 3/2004 |

* cited by examiner

*Primary Examiner* — Robert Wilson
*Assistant Examiner* — Mohamed Kamara
(74) *Attorney, Agent, or Firm* — The Farrell Law Firm, P.C.

(57) ABSTRACT

A mirroring apparatus for providing a mirroring service includes an Internet protocol (IP) address sniffing module for monitoring whether an Internet service provided to a predetermined terminal exists; an IP address converting module for duplicating a packet transmitted to the predetermined terminal according to the Internet service and changing a destination IP address of the duplicated packet to an IP address of other terminals; and a routing module for routing the packet by determining a route of the packet based on the IP address of the packet.

17 Claims, 6 Drawing Sheets

COMMUNICATION SYSTEM, METHOD AND APPARATUS FOR PROVIDING MIRRORING SERVICE IN THE COMMUNICATION SYSTEM

PRIORITY

This application claims priority under 35 U.S.C. §119 to an application entitled "Method and Apparatus for Providing Mirroring Service in Communication System, and the Communication System" filed in the Korean Intellectual Property Office on Jan. 28, 2005 and assigned Serial No. 2005-8178, the contents of which are incorporated herein by reference.

BACKGROUND OF THE INVENTION

1. Field of the Invention

The present invention relates generally to a method of providing a mirroring service and a mirroring apparatus using the same.

2. Description of the Related Art

Accompanying the development of communication services, people can enjoy Internet services through personal computers (PCs) or mobile terminals. PCs receive the Internet services by accessing Internet networks in a wired manner, and mobile terminals receive the Internet services by accessing packet networks in a wireless manner. PCs and mobile terminals can now communicate with each other through the Internet networks.

According to the communication capability between terminals regardless of the wired/wireless connections, services interworked between these end users have been developed.

SUMMARY OF THE INVENTION

An object of the present invention is to provide an apparatus and method for providing services interworked between end terminals including wired terminals and wireless terminals using a conventional communication network.

According to one aspect of the present invention, there is provided a mirroring apparatus for providing a mirroring service, the apparatus including an Internet protocol (IP) address sniffing module for monitoring whether an Internet service provided to a predetermined terminal exists; an IP address converting module for duplicating a packet transmitted to the predetermined terminal according to the Internet service and changing a destination IP address of the duplicated packet to an IP address of other terminals; and a routing module for routing the packet by determining a route of the packet based on the IP address of the packet.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

Figure 1:
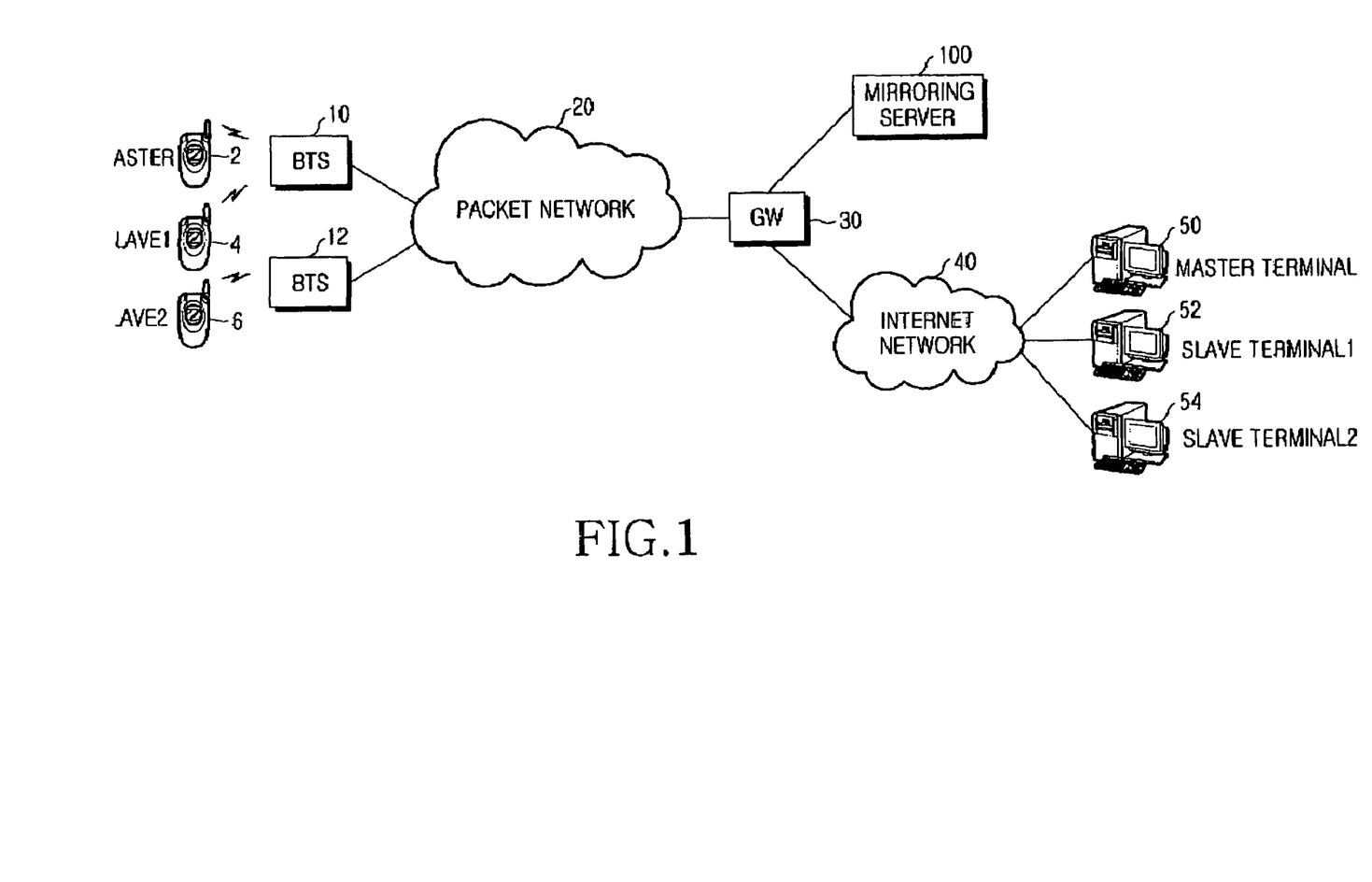
FIG. 1 is a schematic diagram of a communication system for providing a mirroring service according to a preferred embodiment of the present invention.

FIG. 1 is a schematic diagram of a communication system for providing a mirroring service according to a preferred embodiment of the present invention.

Referring to FIG. 1, the communication system for providing the mirroring service includes mobile terminals 2, 4 and 6 and PCs 50, 52 and 54 as end terminals. The mobile terminals 2, 4 and 6 access a packet network 20 through base transceivers (BTSs) 10 and 12 connected to the mobile terminals 2, 4 and 6. The PCs 50, 52 and 54 access an Internet network 40. The packet network 20 and the Internet network 40 are Internet protocol (IP) networks and provide an Internet service to the end terminals. The IP networks include not only the Internet providing Internet applications such as e-mail and the World Wide Web (WWW) but also every network in which IP technology is used.

A gateway 30 is connected between the packet network 20 and the Internet network 40. The gateway 30 is a device to interconnect different communication networks. A mirroring server 100 is connected to the gateway 30. The mirroring server 100 provides a mirroring service to the end terminals.

By the mirroring service, an Internet service provided to an end terminal can be provided to other end terminals. Herein, the end terminal to which the Internet service is originally provided is called a master terminal, and the other end terminals to which the same Internet service as that provided to the master terminal is called slave terminals. The end terminals should be registered in the mirroring server 100 to use the mirroring service. When the end terminals are registered in the mirroring server 100, the end terminals are registered as qualification for the master terminal or the slave terminal. The mirroring server 100 manages information on users registered for the mirroring service.

The communication system for providing the mirroring service also includes at least one Internet server (not shown) for providing the Internet service to each end terminal. For example, the Internet server can provide the Internet service to each end terminal by being included in the packet network 20 or the Internet network 40.

Figure 2:
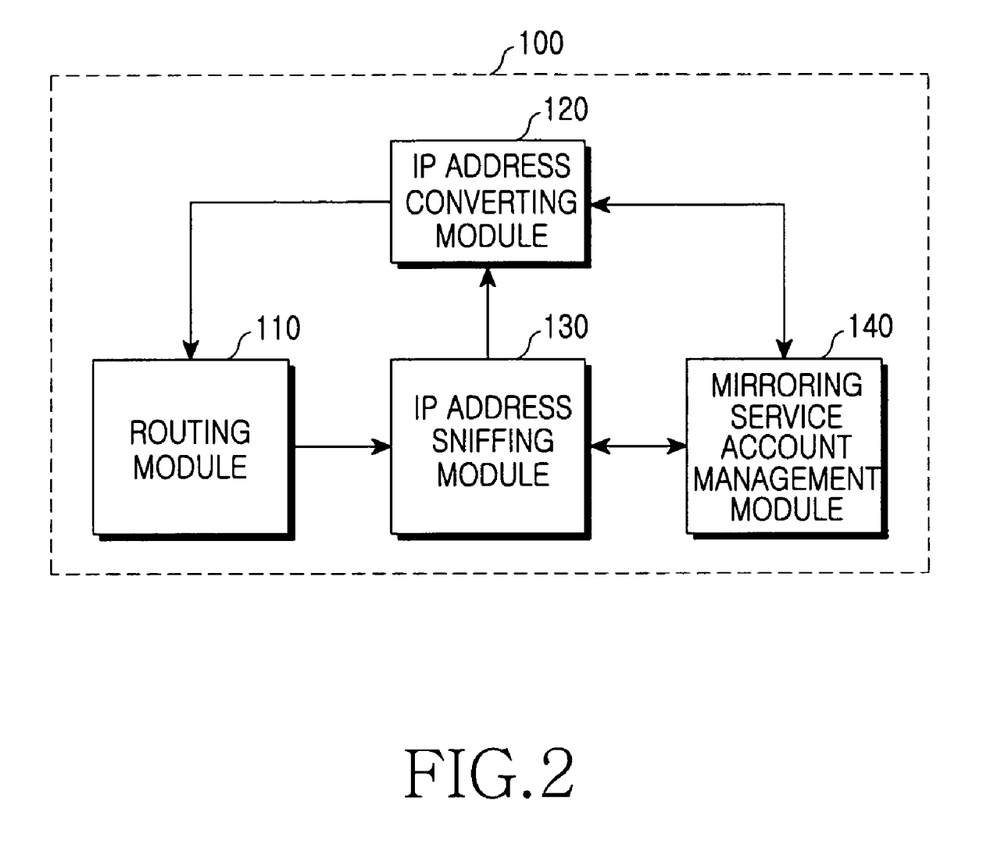
FIG. 2 is a schematic block diagram of a mirroring server according to a preferred embodiment of the present invention.

A configuration and operation of the mirroring server 100 will now be described with reference to FIG. 2, which is a schematic block diagram of the mirroring server 100 according to a preferred embodiment of the present invention. Referring to FIG. 2, the mirroring server 100 includes a routing module 110, an IP address converting module 120, an IP address sniffing module 130, and a mirroring service account management module 140.

The mirroring service account management module 140 manages end terminals deciding whether to join the mirroring service and discriminates whether an end terminal joining the mirroring service is a master terminal or a slave terminal. Mobile terminals can access the mirroring server 100 through the packet network 20, and PCs can access the mirroring server 100 through the Internet network 40. When an end terminal joins the mirroring service, it is preferable that the end terminal is registered as a master terminal. In this case, the end terminal can then register at least one slave terminal. However, the end terminal can also be registered as a slave terminal. In both cases, the master terminal or the slave terminal obtains certification of its master terminal or slave terminals.

The master terminal or the slave terminals can register specific Internet services to which the mirroring service is applied. The master terminal may wish not to provide all Internet services provided to the master terminal to all the slave terminals. In another case, the slave terminals may wish to receive only a specific Internet service among Internet services provided to the master terminal. For example, the master terminal can register some Internet services, which are not provided to the slave terminals, other or Internet services, which are provided to the slave terminals.

Figure 3:
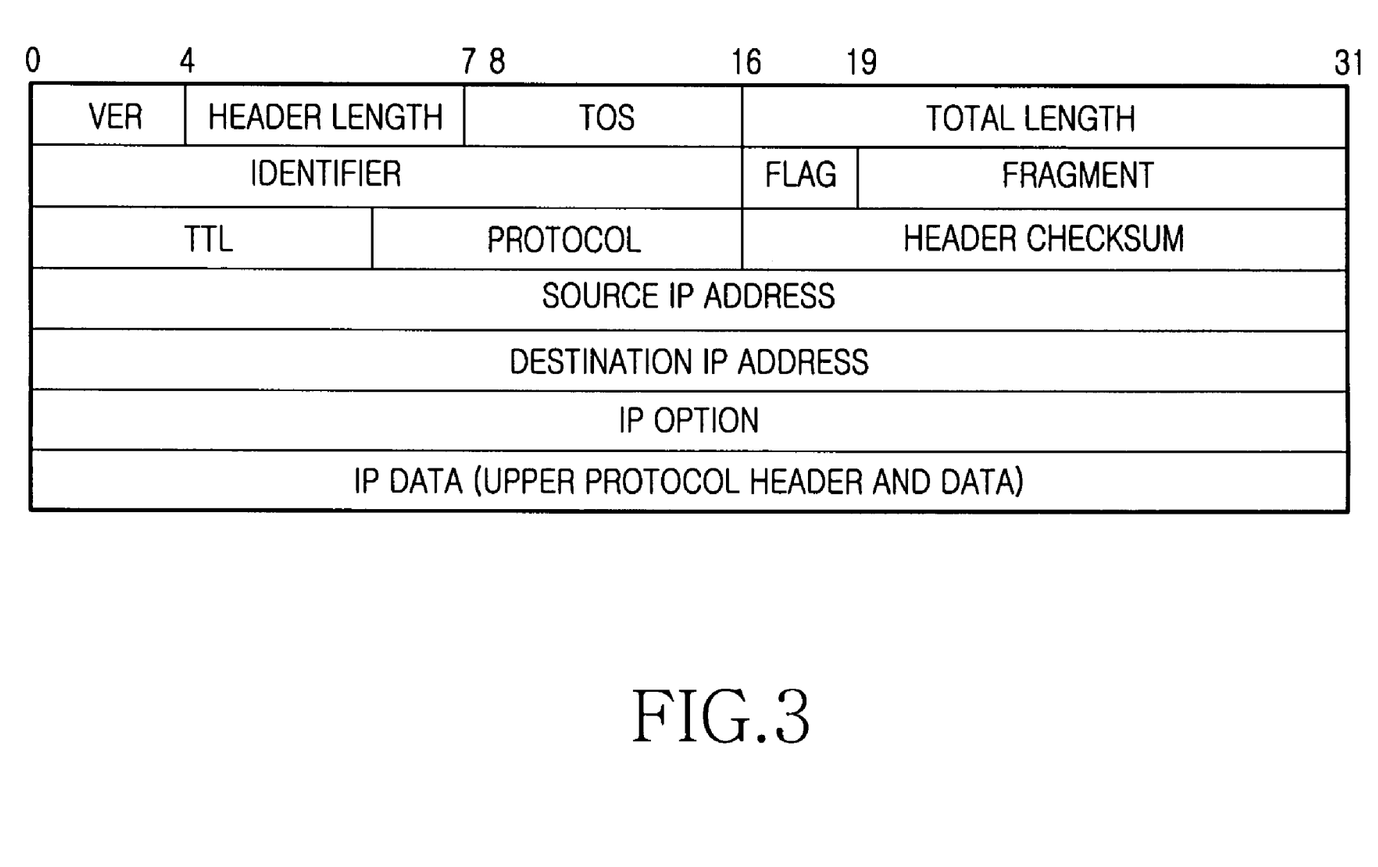
FIG. 3 is a diagram illustrating a conventional IP datagram.

A packet for an Internet service is called an IP datagram. The routing module 110 performs a function of routing an IP datagram by determining a route of the IP datagram based on its IP address. FIG. 3 is a diagram illustrating a conventional IP datagram. Each field of the IP datagram is described in Table 1.

TABLE 1

| Field (number of bits) | Meaning |
| --- | --- |
| Version (VER) (4) | An IP version. |
| Header length (HLEN) (4) | A value obtained by dividing the length of the IP datagram header by 4. |
| Type of service (TOP) (8) | A portion in which a transmission priority of the IP datagram and a method of processing transmitted data are recorded D: low delay, T: high processing rate, R: high reliability. |
| Total length (16) | A byte unit length of the entire IP datagram including a data portion. That is, the maximum size of a transmitted data packet is 216 bytes or 65,535 octets. |
| Identifier (16) | A serial number of the IP datagram transmitted by a source host. |
| Flag (3) | A field indicating whether an IP datagram having the same identifier further remains, and if necessary, indicating whether the IP datagram can be divided in a smaller size. |
| Fragment (13) | A value obtained by dividing a location (byte unit) of the IP datagram among IP datagrams having the same identifier by 8. That is, integer times of 8 octets. |
| Time to live (TTL) (8) | A field to define that the IP datagram is allowed to pass through up to how many routers in a process of transmitting the IP datagram over the Internet. |
| Protocol (8) | It is determined that data included in the IP datagram is for what kind of upper protocol (usually, one of TCP, UDP, and ICMP). |
| Header checksum (16) | A checksum result for determining whether an error exists in a header portion of the IP datagram. |
| Source IP address (32) | A source host IP address of the IP datagram. |
| Destination IP address (32) | A destination host IP address of the IP datagram. |
| IP option (16) | An option area used for IP operation checking, route designation, or security. |

The IP address sniffing module 130 monitors whether an Internet service provided to the master terminal exists. The IP address sniffing module 130 determines whether an IP datagram of which a destination host IP address is an IP address of the master terminal is generated. That is, the master terminal receives the IP datagram when an Internet service is provided. The IP address sniffing module 130 checks whether a packet having the IP address of the master terminal as the destination host IP address in the packet network 20 or the Internet network 40 exists. If the destination host IP address is the IP address of the master terminal, the IP address sniffing module 130 informs the IP address converting module 120 of this.

The IP address converting module 120 duplicates the packet transmitted to the master terminal, changes a destination IP address of the duplicated packet to an IP address of a slave terminal, and provides the changed IP address to the routing module 110.

Herein, the IP address converting module 120 can determine whether the packet corresponds to an Internet service registered by the master terminal by referring to the mirroring service account management module 140. If the packet corresponds to an Internet service defined to not provide the mirroring service by the master terminal, the IP address converting module 120 ends the mirroring service.

Figure 4:
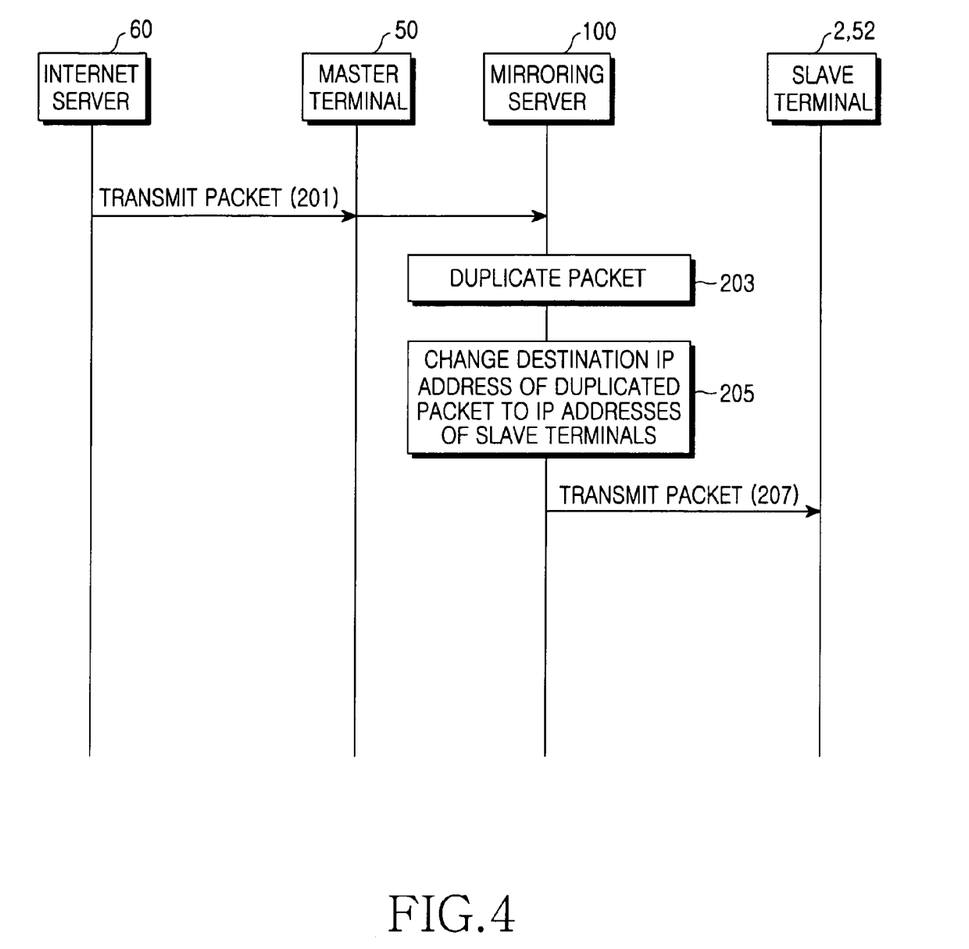
FIG. 4 is a signaling diagram illustrating a message flow in a communication system when a mirroring service is performed according to a preferred embodiment of the present invention.

FIG. 4 is a signaling diagram illustrating a message flow in the communication system when the mirroring service is performed according to a preferred embodiment of the present invention.

Referring to FIG. 4, a master terminal 50 can use an Internet service by accessing an Internet server 60. Then, in step 201, the Internet server 60 transmits a packet according to the Internet service to the master terminal 50. Herein, the packet according to the Internet service is also transmitted to the mirroring server 100. That is, an IP datagram arrives at the mirroring server 100 too since the IP datagram is broadcasted in the Internet network 40 and the packet network 20.

In step 203, the mirroring server 100 duplicates the packet transmitted to the master terminal 50. In step 205, the mirroring server 100 changes a destination IP address of the duplicated packet to the IP addresses of the slave terminals. In step 207, the mirroring server 100 transmits the duplicated packet to the slave terminals (e.g., 2 and 52). Likewise, the mirroring server 100 transmits the Internet service provided to the master terminal 50 to the slave terminals.

Figure 5:
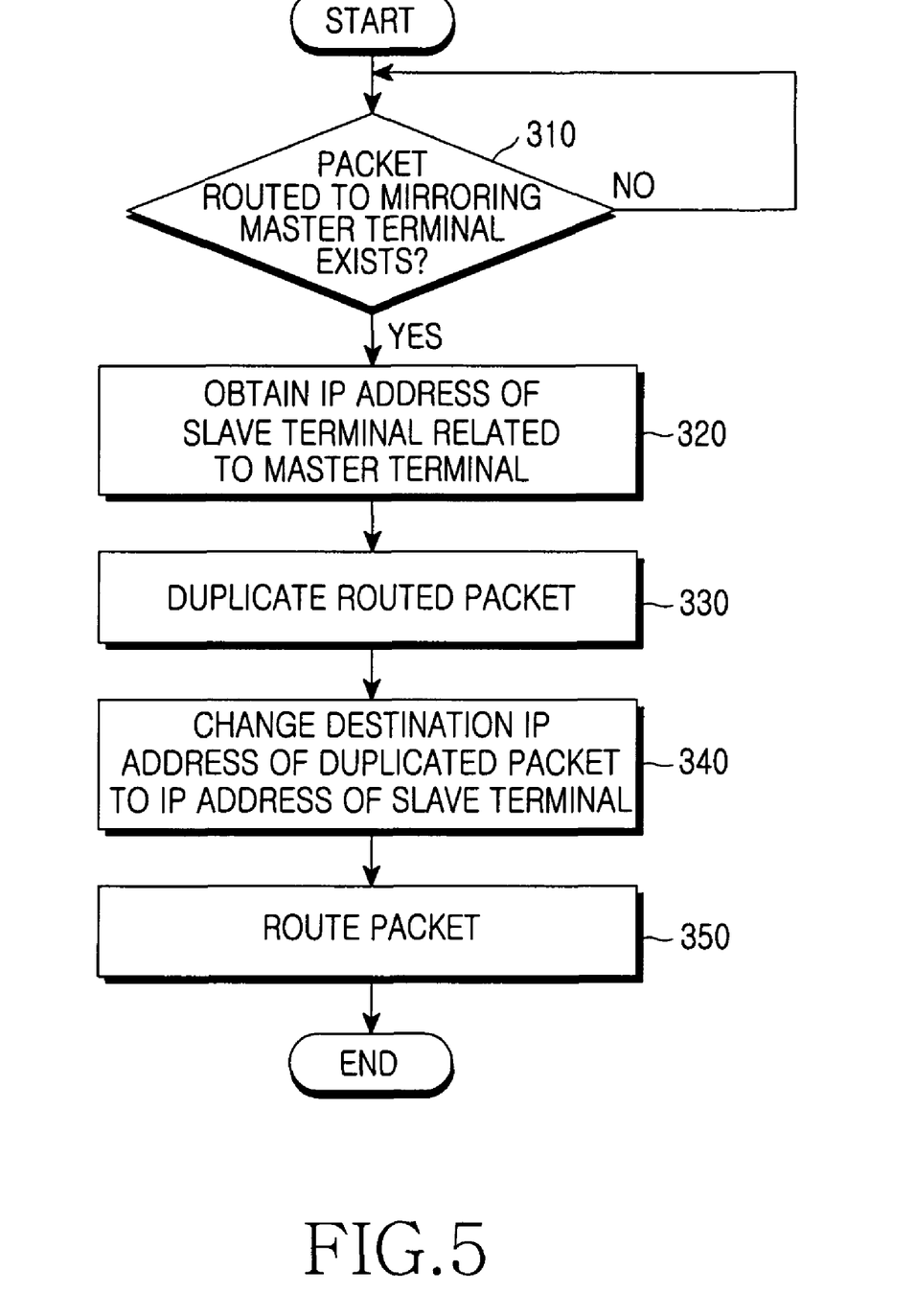
FIG. 5 is a flowchart illustrating a process of providing a mirroring service in a mirroring server according to a first preferred embodiment of the present invention.

FIG. 5 is a flowchart illustrating a process of providing the mirroring service in the mirroring server 100 according to a first preferred embodiment of the present invention.

Referring to FIG. 5, in step 310, the mirroring server 100 determines whether a packet routed to a mirroring master terminal exists. As described above, the mirroring server 100 checks whether a destination host IP address of an IP datagram is identical to an IP address of the mirroring master terminal. If the destination host IP address of the IP datagram is identical to the IP address of the master terminal, in step 320, the mirroring server 100 obtains an IP address of at least one slave terminal registered for the master terminal. In step 330, the mirroring server 100 duplicates the packet routed to the master terminal. In step 340, the mirroring server 100 changes the destination IP address of the duplicated packet to the IP address of the slave terminal. In step 350, the mirroring server 100 routes the duplicated packet to the slave terminal.

Figure 6:
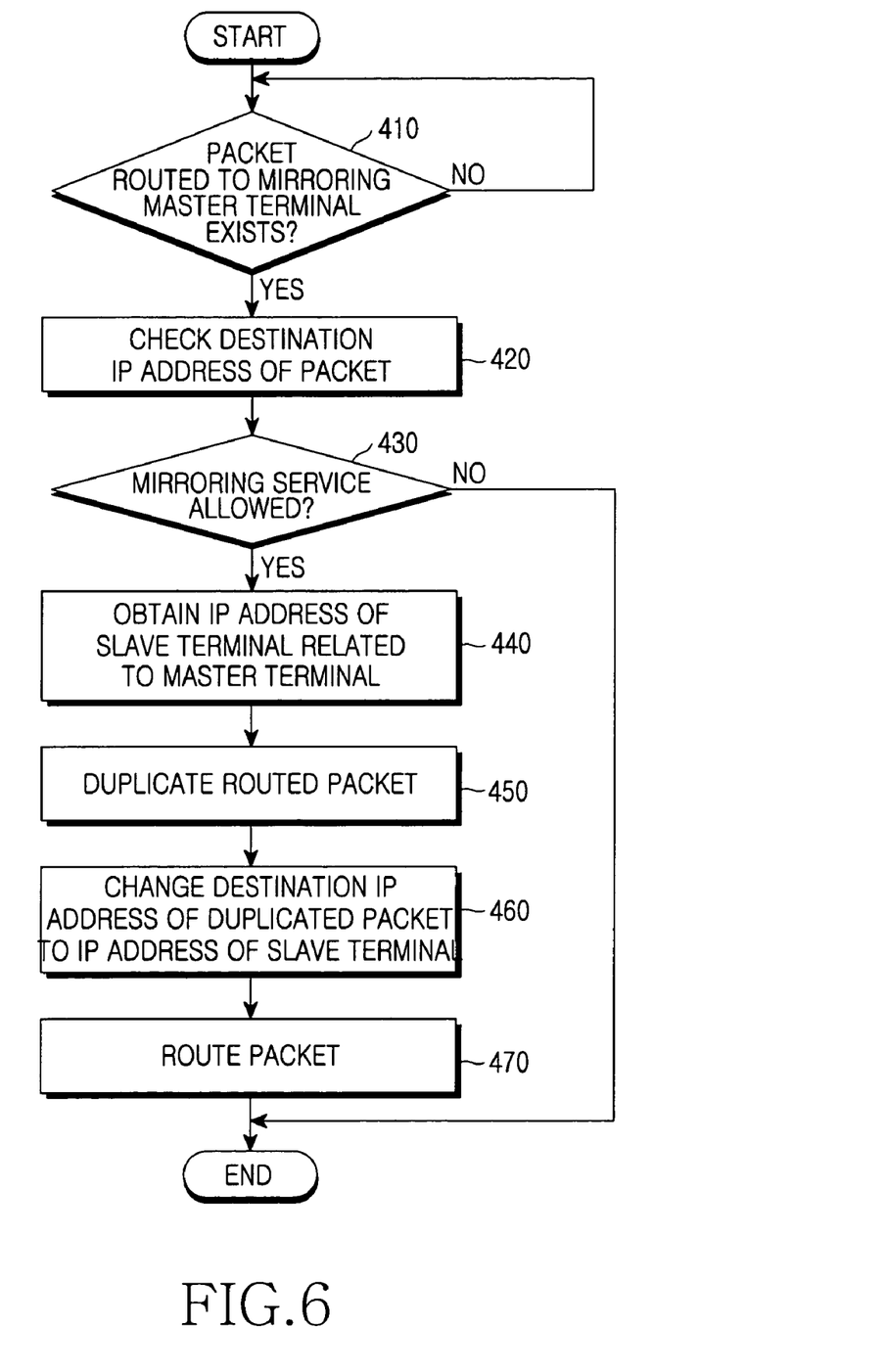
FIG. 6 is a flowchart illustrating a process of providing a mirroring service in a mirroring server according to a second preferred embodiment of the present invention.

FIG. 6 is a flowchart illustrating a process of providing the mirroring service in the mirroring server 100 according to a second preferred embodiment of the present invention.

Referring to FIG. 6, in step 410, the mirroring server 100 determines whether a packet routed to a mirroring master terminal exists. If the packet routed to the master terminal exists, in step 420, the mirroring server 100 checks a source IP address of the packet. In step 430, the mirroring server 100 determines whether the source IP address corresponds to an Internet service defined to not provide the mirroring service by the master terminal. If the source IP address corresponds to the Internet service defined to not provide the mirroring service by the master terminal, the mirroring server 100 ends the mirroring service.

If the source IP address corresponds to the Internet service defined to provide the mirroring service by the master terminal, in step 440, the mirroring server 100 obtains an IP address of at least one slave terminal registered for the master terminal. In step 450, the mirroring server 100 duplicates the packet routed to the master terminal. In step 460, the mirroring server 100 changes a destination IP address of the duplicated packet to the IP address of the slave terminal. In step 470, the mirroring server 100 routes the duplicated packet to the slave terminal.

As described above, by an Internet mirroring service according to embodiments of the present invention, a plurality of users can share an Internet service provided to a specific device in real time using all Internet accessible wired/wireless devices. For example, a case of sharing Internet information and simultaneously performing voice communication corresponds to this case (e.g., when a sales person shares information on a new product with a plurality of customers over the Internet).

While the invention has been shown and described with reference to a certain preferred embodiment thereof, it will be understood by those skilled in the art that various changes in form and details may be made therein without departing from the spirit and scope of the invention as defined by the appended claims. For example, though a master terminal registers Internet services, which are not provided to slave terminals in the embodiments described above, the slave terminals also can register specific Internet services related to the mirroring service.

What is claimed is:

1. A minoring apparatus for providing a mirroring service, the apparatus comprising:
    an Internet protocol (IP) address sniffing module for monitoring whether an Internet service, received from a network and provided to a master terminal, to which the mirroring service is applied, exists in accordance with a source IP address, the Internet service being registered for the mirroring service by the master terminal, and determining whether at least one slave terminal is registered for the mirroring service by the master terminal when the Internet service exists;
    an IP address converting module for duplicating a packet transmitted to the master terminal according to the Internet service and changing a destination IP address of the duplicated packet to at least one IP address of the at least one slave terminal, when the at least one slave terminal is registered for the mirroring service by the master terminal; and
    a routing module for routing the packet by determining a route of the packet based on an IP address of the packet.

2. The apparatus of claim 1, wherein the master and at least one slave terminals join the mirroring service, and when the terminals join the mirroring service, the terminals register a qualification of the master terminal or slave terminal.

3. The apparatus of claims 1, further comprising:
    a mirroring service account management module for managing whether the master and at least one slave terminals join the mirroring service and discriminating whether the terminals joining the mirroring service operate as master or slave.

4. The apparatus of claim 1, wherein the IP address sniffing module monitors whether the Internet service is provided to the master terminal by checking whether a destination host IP address of a packet for the Internet service is identical to the IP address of the master terminal.

5. The apparatus of claim 1, wherein at least one of the master and at least one slave terminals can register an Internet service to which the mirroring service is not applied.

6. A mirroring method for providing a mirroring service in a mirroring server, the method comprising the steps of:
    monitoring, by an Internet Protocol (IP) address sniffing module of the mirroring server, whether an Internet service, received from a network and provided to a master terminal, to which the mirroring service is applied, exists in accordance with a source IP address, the Internet service being registered for the mirroring service by the master terminal, and determining whether at least one slave terminal is registered for the mirroring service by the master terminal when the Internet service exists;
    duplicating a packet transmitted to the master terminal according to the Internet service and changing a destination Internet Protocol (IP) address of the duplicated packet to at least one IP address of the at least one slave terminal, at an IP address changing module of the mirroring server, when the at least one slave terminal is registered for the mirroring service by the master terminal; and
    routing the packet by determining a route of the packet based on the IP address of the packet at a routing module of the mirroring server.

7. The method of claim 6, wherein the step of monitoring comprises:
    checking whether a destination host IP address of a packet for an Internet service is identical to the IP address of the master terminal.

8. The method of claim 6, further comprising the step of:
    registering, by at least one of the master and at least one slave terminals, an Internet service to which the mirroring service is not applied.

9. The method of claim 6, further comprising the steps of:
    joining the master and at least one slave terminals in the mirroring service; and
    registering a qualification of the master terminal or slave terminal when the terminals joins the mirroring service.

10. A communication system for providing a mirroring service, the system comprising:
    a master terminal to which an Internet service is provided;
    at least one slave terminal defined to provide thereto the same Internet service as that provided to the master terminal; and
    a mirroring server for monitoring whether an Internet service, received from a network and provided to the master terminal, to which the mirroring service is applied, exists in accordance with a source IP address, the Internet service being registered for the mirroring service by the master terminal, determining whether at least one slave terminal is registered for the mirroring service by the master terminal when the Internet service exists, duplicating a packet transmitted to the master terminal according to the Internet service when the at least one slave terminal is registered for the mirroring service by the master terminal, changing a destination Internet Protocol (IP) address of the duplicated packet to an IP address of the at least one slave terminal, and routing the duplicated packet to the changed IP address.

11. The system of claim 10, wherein the mirroring server comprises:
    an IP address sniffing module for monitoring whether the Internet service provided to the master terminal exists.

12. The system of claim 10, wherein the mirroring server comprises:
    an IP address converting module for duplicating the packet transmitted to the master terminal according to the Internet service and changing the destination IP address of the duplicated packet to the IP address of the at least one slave terminal.

13. The system of claim 10, wherein the mirroring server comprises:
    a routing module for routing the packet by determining a route of the packet based on the IP address of the packet.

14. The system of claim 10, wherein the mirroring server further comprises:
    a mirroring service account management module for managing whether the master and at least one slave terminals join the mirroring service and determining whether the terminals joining the mirroring service operate as master or slave.

15. The system of claim 10, wherein the mirroring server monitors whether the Internet service provided to the master terminal by checking whether a destination host IP address of the packet for the Internet service is identical to the IP address of the master terminal.

16. The system of claim 10, wherein at least one of the master and at least one slave terminals can register an Internet service to which the mirroring service is not applied.

17. The system of claim 10, wherein the master terminal joins the mirroring service and registers the at least one slave terminal.

\* \* \* \* \*